United States Patent [19]
James et al.

[11] Patent Number: 5,495,064
[45] Date of Patent: Feb. 27, 1996

[54] IMMOBILIZATION OF METAL CONTAMINANTS FROM A LIQUID TO A SOLID MEDIUM

[75] Inventors: Michael L. James, Sandbach; Mark A. Rose, Louth, both of England

[73] Assignee: Albright & Wilson Limited, Warley, England

[21] Appl. No.: 232,224

[22] PCT Filed: Nov. 11, 1992

[86] PCT No.: PCT/GB92/02086

§ 371 Date: May 4, 1994

§ 102(e) Date: May 4, 1994

[87] PCT Pub. No.: WO93/09849

PCT Pub. Date: May 27, 1994

[30] Foreign Application Priority Data

Nov. 15, 1991 [GB] United Kingdom ............... 9124353

[51] Int. Cl.[6] ........................................ A62D 3/00
[52] U.S. Cl. ........................ 588/256; 405/129; 588/257
[58] Field of Search ........................ 588/249, 252, 588/256, 257; 405/128, 129

[56] References Cited

U.S. PATENT DOCUMENTS

| | | |
|---|---|---|
| 4,200,620 | 4/1980 | Ehlers et al. . |
| 4,279,876 | 7/1981 | Schrodter et al. . |
| 4,457,848 | 7/1984 | Schimmel et al. ............ 210/724 |
| 4,671,882 | 6/1987 | Douglas et al. . |
| 4,737,356 | 4/1988 | O'Hara et al. . |

FOREIGN PATENT DOCUMENTS 0189062 7/1986 Germany .

Primary Examiner—George A. Suchfield
Attorney, Agent, or Firm—Frishauf, Holtz, Goodman, Langer & Chick

[57] ABSTRACT

A method for the immobilization of heavy metal contaminant from a liquid medium containing sulfuric acid and one or more acids of phosphorus, for example in the treatment of acid raffinates generated during the purification of phosphoric acid. The method includes the steps of (i) neutralizing the liquid medium with a stoichiometric excess of an alkaline earth metal oxide to form agglomerates, and (ii) treating the agglomerates with water to form a solid cementitious material wherein the heavy metal contaminants are substantially chemically isolated.

14 Claims, No Drawings

IMMOBILIZATION OF METAL CONTAMINANTS FROM A LIQUID TO A SOLID MEDIUM

This invention relates to the immobilization of metal contaminants from a liquid to a solid medium and in particular to a method for the immobilization of heavy metal contaminants from a liquid medium containing acids of phosphorus.

The present invention will be described herein with particular reference to the immobilization of heavy metal contaminants from acidic raffinates generated during the commercial production of phosphoric acid, but is not to be construed as being limited thereto.

Phosphoric acid is used in the manufacture of neutral phosphates and polyphosphates, which in turn find wide application in the food and detergent industries.

Phosphoric acid is obtained from naturally-occurring phosphate-containing rock. The rock is mixed with concentrated sulfuric acid and the crude phosphoric acid thus produced is removed, leaving behind a gypsum slurry waste stream. The crude phosphoric acid is then extracted into an organic solvent, from which it is subsequently stripped to produce purified phosphoric acid.

The purification process leads to generation of a secondary phosphoric acid stream (the underflow), which contains a large proportion of the various contaminants, including heavy metals, originally present in the phosphate rock.

The secondary phosphoric acid stream is treated in a second extraction plant, where residual phosphoric acid is extracted for re-use. The heavy metal contaminants, together with some residual phosphorus (present as phosphoric acid), remain in a sulfuric acid-rich stream (raffinate).

Hitherto, the raffinate has been treated by partial neutralization as a slurry followed by discharge to the sea. Although the level of heavy metal contaminants in the discharge has been kept within the prescribed limits laid down by the appropriate authority, there is pressure to reduce such sea discharge, necessitating alternative methods of disposal.

It has now been found that neutralization of the raffinate with an alkaline earth metal oxide to form agglomerates, followed by treatment of the agglomerates with water, results in the formation of a solid material of generally cementitious nature, which isolates the heavy metal contaminants within the solid material. Chemical leaching tests on the solid material have shown that the heavy metal contaminants (including cadmium, chromium, lead and members of the uranium radioactive decay series) cannot be leached out from the solid cementitious material, which may suitably be used for Landfill or similar purposes.

Accordingly, the present invention provides a method for the immobilization of heavy metal contaminants from a liquid medium containing sulfuric acid and one or more acids of phosphorus, said method comprising:

a) neutralizing the liquid medium with a stoichiometric excess of an alkaline earth metal oxide to form agglomerates;

(b) treating the agglomerates with water to form a solid cementitious material wherein the heavy metal contaminants are substantially chemically isolated.

The present invention also provides a solid cementitious material made by the method described in the immediately-preceding paragraph.

The liquid medium is suitably an acidic raffinate generated during the purification of phosphoric acid. This raffinate contains approximately 40% by weight sulfuric acid and approximately 8% by weight phosphoric acid, together with metal sulfates and various heavy metal contaminants.

The preferred alkaline earth metal oxide for neutralization of the raffinate is calcium oxide (which may suitably be added as quicklime). The required stoichiometric excess of calcium oxide may be achieved by maintaining the weight ratio of raffinate to calcium oxide within the range 0.1:1 to 3.5:1, preferably 2.6:1 to 3.1:1.

Neutralization of the acidic raffinate with quicklime leads to the formation of agglomerates consisting essentially of calcium sulfate hemihydrate and calcium sulfate anhydrite. Addition of water to the agglomerates converts the calcium sulfate to calcium sulfate dihydrate (gypsum). The heat of reaction is more than sufficient to evaporate off the water present in the raffinate.

Suitably, both the neutralization and the water-treatment are carried out in a single rotary granulation unit.

The present invention will be illustrated by way of the following example:

EXAMPLE

A solid cementitious material (hereinafter referred to as "Landfill Material") was produced by neutralization of raffinate (from a phosphoric acid process) with quicklime, followed by hydration with water. The ratio of raffinate to calcium oxide was 3:1 by weight. Analysis and constituent-compound-breakdown of the resulting Landfill Material are shown in the TABLE (below):

TABLE

| Substituent | Concentration |
|---|---|
| *Typical Analysis* | |
| $SO_4$ | 38% |
| Ca | 20% |
| $P_2O_5$ | 5% |
| Na | 2% |
| Mg | 1.7% |
| Fe | 0.5% |
| Zn | 0.3% |
| Al | 0.14% |
| Cr | 0.13% |
| V | 800 ppm |
| Mn | 200 ppm |
| Ti | 300 ppm |
| U | 300 ppm |
| Ni | 250 ppm |
| F | 0.3% |
| Cu | 130 ppm |
| Pb | 1 ppm |
| Cd | 170 ppm |
| Mo | 30 ppm |
| As | 1 ppm |
| Hg | <0.5 ppm |
| *Major Components* | |
| $CaSO_4.2H_2O$ | 61% |
| $Ca_{10}(PO_4)_6(OH)_2$ | 12% |
| $Na_2SO_4.7H_2O$ | 12% |
| $H_2O$ (Free) | 7 |
| $Ca(OH)_2$ | 3 |
| pH = 12 (5% slurry) | |

The above analysis is of the Landfill Material generated using a 3:1 raffinate: CaO ratio. Solid generation from 1 tonne of raffinate will be 1.2 tonnes. Lowering the ratio will increase the excess calcium hydroxide and increase the solid generated.

Leaching tests, based on the German standard method (using deionized or distilled water)- DIN 38414 Part 4, show that the material does not leach out heavy metals into solution. The tests also show that the soluble components (including calcium sulfate) will all dissolve after numerous contacts with fresh water. Some of the salts, eg. sodium sulfate, will dissolve more quickly than others.

Although it is not intended that the present invention be construed with reference to any particular theory, it is believed that the constituent of the Landfill Material which serves to retain heavy metal contaminants in a chemically-immobile state is the calcium phosphate/hydroxide compound $Ca_{10}(PO_4)_6(OH)_2$ (hydroxyapatite). This compound remains as a residual solid once all the soluble salts have been removed and appears to lock in the metals, rendering them insoluble. X-Ray diffraction analysis has confirmed the residual material to be hydroxyapatite but no trace of the metal hydroxides, originally suspected to be the reason for the insolubility of metals, has been found. (The landfill material will clearly contain calcium hydroxide and magnesium hydroxide.)

Hydroxyapatite is similar in structure to the naturally-occuring phosphate rock used in the phosphoric acid production process. The metals appear to lock into the hydroxyapatite in the same way as they do naturally in the phosphate rock.

Preferably, the phosphoric acid content of the raffinate should be at least 4% by weight, in order that the metals incorporated into the landfill material do not form hydroxides.

What is claimed is:

1. A method, for the immobilization of heavy metal contaminants from a sulfuric acid-rich liquid medium comprising one or more acids of phosphorus, said method comprising the following steps:

(a) neutralizing said liquid medium with a stoichiometric excess of an alkaline earth metal oxide, whereby agglomerates of said liquid medium and said oxide are formed; and (b) adding sufficient water to said agglomerates to form a solid cementitious material wherein said heavy metal contaminants are substantially chemically isolated.

2. The method of claim 1, wherein said medium contains approximately 40% by weight sulfuric acid and approximately 8% by weight phosphoric acid.

3. The method of claim 2, wherein said liquid medium contains at least 4% by said weight phosphoric acid.

4. The method of claim 1, wherein said liquid medium is an acidic raffinate generated during the purification of phosphoric acid.

5. The method of claim 1, where said alkaline earth metal oxide is calcium oxide.

6. The method of claim 5, wherein the ratio of said liquid medium to said calcium oxide is in the range 0.1:1 to 3.5:1 by weight.

7. The method of claim 6, wherein said ratio is in the range 2.6:1 to 3.1:1 by weight.

8. A method according to claim 2, wherein the alkaline earth metal oxide is calcium oxide.

9. A method according to claim 3, wherein the alkaline earth metal oxide is calcium oxide.

10. A method according to claim 8, wherein the ratio of liquid medium to calcium oxide is in the range 0.1:1 to 3.5:1 by weight.

11. A method according to claim 9, wherein the ratio of liquid medium to calcium oxide is in the range 0.1:1 to 3.5:1 by weight.

12. A method according to claim 6, wherein said ratio is in the range of 2.6:1 to 3.1:1 by weight.

13. A method according to claim 10, wherein said ratio is in the range of 2.6: 1 to 3.1: 1 by weight.

14. A method according to claim 11, wherein said ratio is in the range of 2.6: 1 to 3.1: 1 by weight.

* * * * *